(12) United States Patent
Yin

(10) Patent No.: US 9,246,528 B2
(45) Date of Patent: Jan. 26, 2016

(54) DISTRIBUTED ANTENNA FOR WIRELESS COMMUNICATION AT HIGH SPEED

(71) Applicant: Empire Technology Development LLC, Wilmington, DE (US)

(72) Inventor: Xuefeng Yin, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 48 days.

(21) Appl. No.: 14/349,001

(22) PCT Filed: Jan. 11, 2013

(86) PCT No.: PCT/CN2013/070373
§ 371 (c)(1),
(2) Date: Apr. 1, 2014

(87) PCT Pub. No.: WO2014/107882
PCT Pub. Date: Jul. 17, 2014

(65) Prior Publication Data
US 2015/0147993 A1 May 28, 2015

(51) Int. Cl.
| | |
|---|---|
| *H04B 1/06* | (2006.01) |
| *H04B 7/00* | (2006.01) |
| *H04B 7/015* | (2006.01) |
| *H04B 1/16* | (2006.01) |
| *H04B 1/10* | (2006.01) |
| *H04L 29/08* | (2006.01) |
| *H04W 64/00* | (2009.01) |

(52) U.S. Cl.
CPC .. *H04B 1/16* (2013.01); *H04B 1/10* (2013.01); *H04L 67/12* (2013.01); *H04W 64/006* (2013.01)

(58) Field of Classification Search
CPC .............. H04B 1/16; H04B 1/10; H04B 1/06; H04B 7/00; H04B 7/01; H04B 7/015; H04W 64/006; H04L 67/12
USPC ............. 455/27.1, 277.2, 440, 441, 445, 450, 455/504, 506, 509, 513
See application file for complete search history.

(56) References Cited

U.S. PATENT DOCUMENTS

| | | | | |
|---|---|---|---|---|
| 6,628,235 | B2 * | 9/2003 | Wight ...................... | H01Q 3/00 342/374 |
| 6,862,462 | B2 * | 3/2005 | Hirabe ................. | H01Q 3/2605 455/522 |
| 6,928,296 | B2 * | 8/2005 | Kanemoto ........... | H04B 7/0408 370/335 |
| 6,950,661 | B2 * | 9/2005 | Watanabe ................. | G01S 5/14 342/126 |
| 7,230,524 | B2 * | 6/2007 | Watanabe ............ | B62D 15/027 340/435 |

(Continued)

FOREIGN PATENT DOCUMENTS

| | | |
|---|---|---|
| CN | 1411188 A | 4/2003 |
| CN | 101980453 A | 2/2011 |

(Continued)

OTHER PUBLICATIONS

Zhao, R. et al., "Call Dropping Probability of Next Generation Wireless Cellular Networks with Mobile Relay Station," Second International Conference on Future Networks, Jan. 22-24, 2010, pp. 63-67.

(Continued)

*Primary Examiner* — Pablo Tran
(74) *Attorney, Agent, or Firm* — Brundidge & Stanger, P.C.

(57) ABSTRACT

Technologies and implementations for providing high-speed wireless communication are generally disclosed.

33 Claims, 7 Drawing Sheets

(56) References Cited

U.S. PATENT DOCUMENTS

| | | | |
|---|---|---|---|
| 8,457,222 B2* | 6/2013 | Aziz | H04L 25/0204 375/260 |
| 2003/0069047 A1 | 4/2003 | Kitahara | |
| 2004/0009791 A1* | 1/2004 | Hiramatsu | H04B 7/0491 455/561 |
| 2004/0058678 A1 | 3/2004 | deTorbal | |
| 2007/0117513 A1* | 5/2007 | Kasami | H04W 16/28 455/63.4 |
| 2010/0317293 A1 | 12/2010 | Yokoyama | |

FOREIGN PATENT DOCUMENTS

| | | |
|---|---|---|
| CN | 102856665 A | 1/2013 |
| EP | 2161854 A2 | 3/2010 |

OTHER PUBLICATIONS

International Search Report and Written Opinion for International Patent Application No. PCT/CN2013/070373 mailed Oct. 24, 2013.

* cited by examiner

500 A computer program product

502 A signal bearing medium 504 at least one of machine-readable instructions, which, if executed by one or more processors, operatively enable a computing device to:

receive a wireless signal from a wireless communication station via a first antenna, the wireless communication station capable of motion;

determine an angle of the received wireless signal, the angle based at least in part on a potential rate of motion of the wireless communication station relative to a position of the first antenna and a position of a base station;

determine if the angle is substantially outside a predetermined angle; and utilize a second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

| 506 a computer-readable medium | 508 a recordable medium | 510 a communications medium |

FIG. 5

600 A computer program product

602 A signal bearing medium 604 at least one of receive, at a wireless communication station capable of motion, a wireless signal from a base station via a first antenna communicatively coupled to the wireless communication station;

determine an angle of the received wireless signal, the angle based at least in part on a potential rate of motion of the wireless communication station relative to a position of the base station;

determine if the angle is substantially outside a predetermined angle; and utilize a second antenna communicatively coupled to the wireless communication station, if it is determined that the angle is substantially outside the predetermined angle, the second antenna having a location capable of receiving the wireless signal substantially within the predetermined angle based at least in part on the potential rate of motion of the wireless communication station.

| 606 a computer-readable medium | 608 a recordable medium | 610 a communications medium |

FIG. 6

DISTRIBUTED ANTENNA FOR WIRELESS COMMUNICATION AT HIGH SPEED

CROSS-REFERENCE TO RELATED APPLICATION

This application is the National Stage filing under 35 U.S.C. §371 of PCT Application Ser. No. PCT/CN13/70373 filed on Jan. 11, 2013.

BACKGROUND

Unless otherwise indicated herein, the approaches described in this section are not prior art to the claims in this application and are not admitted to be prior art by inclusion in this section.

Electronic devices are increasingly connected via wireless signals. For example, a smart phone may wirelessly connect to a cellular network to facilitate making voice calls as well as accessing data services. However, maintaining an adequate wireless signal while moving at relatively high speeds may be difficult. For example, it may be difficult to maintain an adequate wireless signal with a cellular network while traveling on a high-speed train. As will be appreciated, high-speed trains may be able to travel at speeds exceeding 200 KM/h. As such, various effects (e.g., Doppler frequency shift, scattering, or the like) may cause the wireless signal to deteriorate when the train is moving at such high speeds.

Although some systems may be adapted to wireless communications at high speed, they may not be suitable for all types of wireless communication or for all settings in which wireless communication may be desired. For example, wireless optical systems (e.g., laser-based systems, or the like) may not be suitable for data transmission services (e.g., accessing data over a cellular network or other type of wireless data access). Such optical systems may also be affected by various external factors (e.g., weather, terrain, or the like) and further it may not be economically efficient to deploy such systems in large scale.

SUMMARY

Detailed herein are various illustrative methods for providing wireless communication at high speeds. Example methods may include receiving, at a base station, a wireless signal from a wireless communication station capable of motion via a first antenna, the first antenna communicatively coupled to the base station, determining an angle of the received wireless signal, the angle based at least in part on a potential rate of motion of the wireless communication station relative to a position of the first antenna and a position of the base station, determining if the angle is substantially outside a predetermined angle, and utilizing a second antenna, if it is determined that the angle is substantially outside the predetermined angle, the second antenna having a location capable of receiving the wireless signal substantially within the predetermined angle. The location of the second antenna based at least in part on the potential rate of motion of the wireless communication station and the determined angle.

Example methods may include receiving, at a wireless communication station capable of motion, a wireless signal from a base station via a first antenna communicatively coupled to the wireless communication station, determining an angle of the received wireless signal, the angle based at least in part on a potential rate of motion of the wireless communication station relative to a position of the base station, determining if the angle is substantially outside a predetermined angle, and utilizing a second antenna communicatively coupled to the wireless communication station, if it is determined that the angle is substantially outside the predetermined angle, the second antenna having a location capable of receiving the wireless signal substantially within the predetermined angle based at least in part on the potential rate of motion of the wireless communication station.

The present disclosure also describes various example systems. Example systems may include a base station, a first antenna communicatively coupled to the base station, a second antenna communicatively coupled to the base station, a communication management module communicatively coupled to the base station, the first antenna, and the second antenna, and a machine readable non-transitory medium having stored therein instructions that, when executed by one or more processors, operatively enable the communication management module to receive a wireless signal from the wireless communication station via the first antenna, determine an angle of the received wireless signal based at least in part on a potential rate of motion of the wireless communication station relative to a position of the first antenna and a position of the base station, determine if the angle is substantially outside a predetermined angle, and utilize the second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

The present disclosure also describes example machine readable non-transitory media having stored therein instruction that, when executed, cause a communication system to provide wireless communication at high speeds. Example machine readable non-transitory media may include instructions that, when executed, operatively enable a communication management module to receive a wireless signal from a wireless communication station via a first antenna, the wireless communication station capable of motion, determine an angle of the received wireless signal, the angle based at least in part on a potential rate of motion of the wireless communication station relative to a position of the first antenna and a position of a base station, determine if the angle is substantially outside a predetermined angle, and utilize a second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings.

Understanding that these drawings depict only several embodiments in accordance with the disclosure and are, therefore, not to be considered limiting of its scope, the disclosure will be described with additional specificity and detail through use of the accompanying drawings.

In the drawings:

FIG. 1 illustrates an example wireless communication system;

FIG. 2 illustrates another example wireless communication system;

FIG. 3 illustrates an example method for wireless communication with a base station;

FIG. 4 illustrates an example method for wireless communication with a wireless communication station capable of motion;

FIG. 5 illustrates an example computer program product;

FIG. 6 illustrates an example computer program product; and

FIG. 7 illustrates a block diagram of an example computing device, all arranged in accordance with at least some embodiments of the present disclosure.

DETAILED DESCRIPTION

Figure 1:
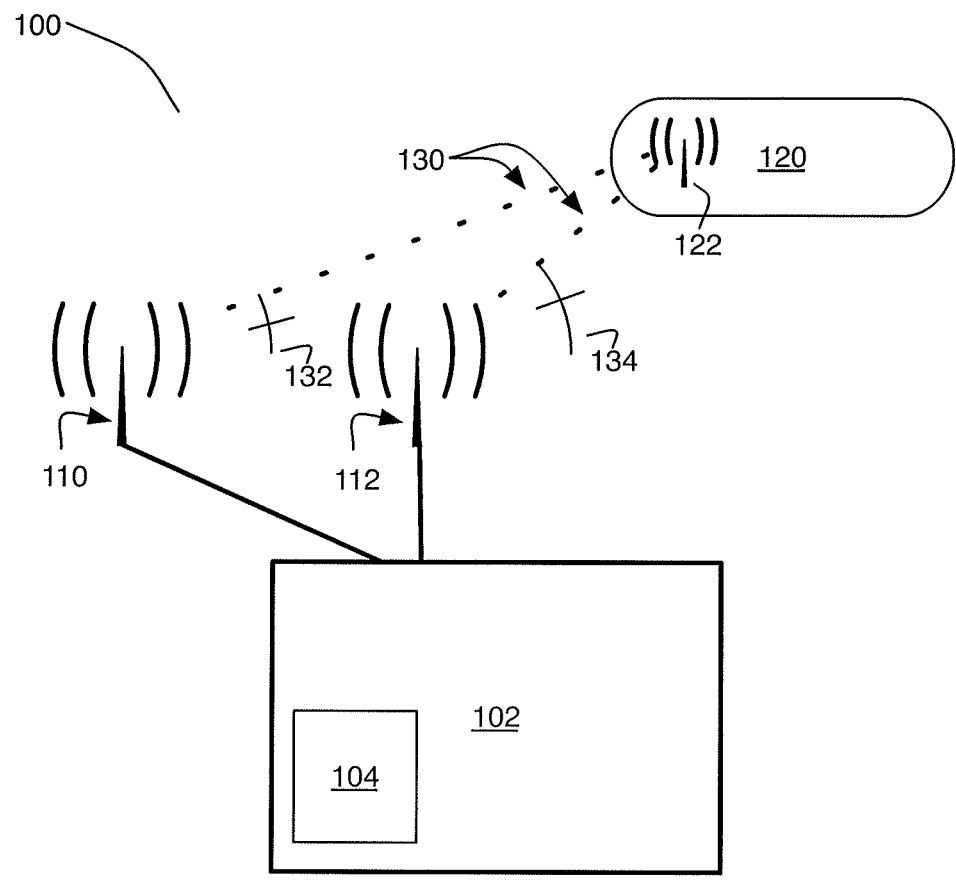

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, systems and computer-readable media related to providing wireless communication at high speeds.

As indicated above, it may be difficult to maintain adequate wireless signal quality when traveling at high speeds. For example, using cellular service (e.g., making a voice call, accessing data, or the like) while traveling on a high-speed train may be difficult due to the speed at which the train is moving. Particularly, as some cellular technologies (e.g., 2 G, 3 G, 4 G, or the like) may not support communications with satisfactory quality of service at such speeds (e.g., greater than 200 KM/h, or the like).

At high speeds, various effects (e.g., Doppler Shift, scattering, or the like) may also affect the quality of a wireless signal. For example, the setting (e.g., terrain having a limited line of sight, adverse weather conditions, or the like) in which the communication devices may be located may increase the negative affects that scattering has on the wireless signal. Accordingly, it may not be possible to maintain an adequate wireless signal while moving at high speed (e.g., traveling on a high-speed train, traveling in an automobile at high speed, traveling in a small aircraft, or the like).

Various embodiments of the present disclosure may provide wireless communication while moving at high speed. In order to provide a brief introduction to the various embodiments of the present disclosure, the following non-limiting example is given. Cellular network access for users traveling on a high-speed train may be provided by utilizing an antenna array having a first and a second antenna. The first antenna and the second antenna may be deployed such that their main directions of radiation are separated by a predetermined angle (e.g., approximately 120 degrees, or the like). Subsequently, a communication device (e.g., a cellular phone, a smart phone, a tablet computer, or the like) may be used to access the cellular network from the high-speed train by connecting with the antenna in the antenna array (e.g., either the first antenna or the second antenna), which has a main direction of radiation closest to the direction the train is traveling. Accordingly, the amount of scattering introduced into the wireless signal may be reduced.

As stated, the above example is given for illustrative purposes only and is not intended to be limiting. Furthermore, although reference herein may be made to the example of the high-speed train, various embodiment of the present disclosure may be provided to facilitate wireless communication while traveling at high speeds (e.g., in excess of 200 KM/h, or the like) using other forms of transportation or movement. Further still, although reference herein may be made to cellular network communication, various embodiments of the present disclosure may be applied to other wireless communication technologies.

FIG. 1 illustrates a block diagram of an example system 100 for wireless communication, arranged in accordance with at least some embodiments of the present disclosure. As shown, the system 100 may include a base station 102 having a first antenna 110 and a second antenna 112. Furthermore, a wireless communication station 120 having a wireless communication station antenna 122 is shown. In general, the wireless communication station 120 may be used to wirelessly communicate (e.g., using cellular technology, using packet switching technology, or the like) with the base station 102. In various embodiments, wireless communication may be facilitated even while the wireless communication station 120 is in motion at a high rate of speed.

As will be appreciated, this communication may include transmitting (e.g., using FM, using SSB, using GSM, using 3 G, using 4 G, or the like) wireless signals between the wireless communication station 120 and the base station 102. FIG. 1 therefore shows an example wireless signal 130. In some embodiments, the wireless signal 130 may be transmitted from the wireless communication station 120 (e.g., using the antenna 122) to the base station 102. Accordingly, the wireless signal 130 may originate from the antenna 122 and may be incident upon the antennas 110 and 112. FIG. 1 also shows angles of incidence 132 and 134. In general, the angles of incidence 132 and 134 may correspond to the angle between the antenna 122 and the antennas 110 and 112 respectively. The base station 102 then may use the wireless signal 130 as received by either the first antenna 110 or the second antenna 112 depending upon the value of the angles 132 and 134. For example, the value of the angle 132 may be closer to a target angle value than the value of the angle 134. As such, the base station 102 may use the wireless signal 130, as received at the first antenna 110, for wireless communication with the wireless communication station 120. As another example, the value of the angle 132 may be outside a target range (e.g., 120 degrees, or the like). As such, the base station 102 may use the wireless signal 130, as received at the second antenna 112, for wireless communication with the wireless communication station 120.

The base station 102 may include a communication management module 104, which may be housed separately or together with the base station 102. Communication management module 104 may include logic and/or features configured to determine the angles 132 and 134 and also to cause the base station 102 to use either the first antenna 110 or the second antenna 112 depending upon the value of the determined angles 132 and 134.

In some examples, the wireless communication station 120 may be in motion during the wireless communication. For example, the wireless communication station 120 may be a portable communication device (e.g., a smart phone, a tablet computer, a handheld transceiver, or the like). In other example, the wireless communication station 120 may be part of the communication system of a vehicle (e.g., a space ship, a high-speed train, an airplane, a car, a ship, or the like). Accordingly, the angles 132 and 134 may change (e.g., due to movement of the wireless communication station 120) during operation of system 100. As such, the antenna (e.g., the first antenna 110 or the second antenna 112) used by the base station 102 for wireless communication with the wireless communication station 120 may also change.

In some embodiments, the angles 132 and 134 may be determined based in part upon a potential rate of motion of the wireless communication station 120. The communication management module 104 may therefore include logic and/or features configured to determine the first angle 132 and the second angle 134 based upon a potential rate of motion of the wireless communication station 120 relative to the base station 102. For example, a potential rate of motion may be determined based upon the position of the first antenna 110 relative to the second antenna 112 and the rate of change in the angles 132 and 134. As another example, the potential rate of motion may be determined based upon a Doppler shift analysis performed on the wireless signal 130 as received at both the first and the second antennas 110 and 112.

In some embodiments, the angles 132 and 134 may correspond to the angle between the main direction of radiation of the antenna 122 and the main directions of radiation of the antennas 110 and 112 respectively. For example, in some embodiments of the present disclosure, the antennas 110, 112 and 122 may have particular radiation patterns. Accordingly, the direction of the main beam of radiation (e.g., the main lobe of the radiation pattern, or the like) for each antenna may be used to determine the angles. For example, the angle 132 may correspond to the angle between the main direction of radiation of the antenna 110 and the antenna 122.

In some examples, the main directions of radiation of the first antenna 110 and the second antenna 112 may be separated by a specific angle, which may be selected to provide a slowly varying propagation channel. More particularly, the angle may be selected to provide a propagation channel for the wireless signal 130 that minimizes time variance; as a result the Doppler frequency may be substantially stable. As an example, referencing the high-speed train introduced above, the angle between the antennas may be selected such that the main propagation channel of the wireless signal 130 (e.g., based upon the radiation pattern of the antennas, or the like) is tangential to the trajectory of the moving train. In some embodiments, the main directions of radiation of the first antenna 110 and the second antenna 112 may be separated by a predetermined angle (e.g., approximately 120 degrees, or the like). In some embodiments, the main directions of radiation of the first antenna 110 and the second antenna 112 may be separated by an angle between 90 and 150 degrees.

In some embodiments of the present disclosure, the antenna (e.g., the first antenna 110 or the second antenna 112) used by the base station 102 for wireless communication with the wireless communication station 120 may be determined based upon a radiation pattern of the antenna 122. For example, the communication management module 104 may include logic and/or features configured to determine the radiation pattern of the antenna 122 based at least in part upon the wireless signal 130 and then cause the base station 102 to use either the first antenna 110 or the second antenna 112 based on the determined radiation pattern. In some examples, the radiation pattern of the antenna 122 may be determined based on a comparison of the radiation pattern of the antenna 122 based at least in part upon the wireless signal 130 as received by the first antenna 110 and the radiation pattern of the antenna 122 based at least in part upon the wireless signal 130 as received by the second antenna 112.

In some examples, the communication management module 104 may include logic and/or features to compensate for a Doppler Shift in the wireless signal 130. For example, the communication management module 104 may model the wireless signal 130 based at least in part on a Jakes' Model, which may then be used to compensate for a Doppler shift in the wireless signal 130.

In some embodiments of the present disclosure, the base station 102 may be part of a communication network (e.g., a cell tower for a cellular network, a radio repeater for Amateur radio use, a radio repeater for military use, or the like). Furthermore, in some examples, the base station 102 may also be connected to the first antenna 110 and the second antenna 112 using wired communication techniques (e.g., fiber optics, conductive cabling, or the like). Additionally, in some examples, the base station 102 may be placed along an expected path of the wireless communication station 120. For example, if the wireless communication station 120 were part of a high-speed train, the base station 102 may be positioned along the tracks of the train. In some examples, multiple base stations 102 may be deployed in a similar manner. Accordingly, the wireless communication station 120 may connect to the nearest (e.g., geographically, best line of sight, least obstructions, or the like) base station as described above (e.g., by using either the first antenna or the second antenna, or the like).

In some examples, the base station 102 may be connected to multiple antennas (e.g., multiple antenna arrays that each include at least a first and a second antenna, or the like). Accordingly, the multiple antennas may be placed along the expected path of the wireless communication station 120. In such embodiments, each base station 102 may include a communication management module 104 (as shown in FIG. 1) or, multiple base stations 102 may share one communication management module 104.

In some embodiments, the base station 102 may provide access to a data network (e.g., the Internet, an SMS network, or the like) for the wireless communication station 120. In some embodiments, the base station 102 may be used to transmit and/or receive data (e.g., a digital video feed, sensor measurement data, Internet protocol data, or the like) between the base station 102 and the wireless communication station 120.

It is to be appreciated, that although FIG. 1 is described with reference to the wireless signal 130 being transmitted from the mobile communication station 120 to the base station 102, transmission from the base station 102 to the mobile communication station 120 may also be provided. For example, the base station 102 may transmit using the antenna (e.g., the antenna 110 or the antenna 112) selected to receive the wireless signal 130. Alternatively, the mobile communication station 120 may be provided with multiple antennas, similar to the base station 102.

Figure 2:
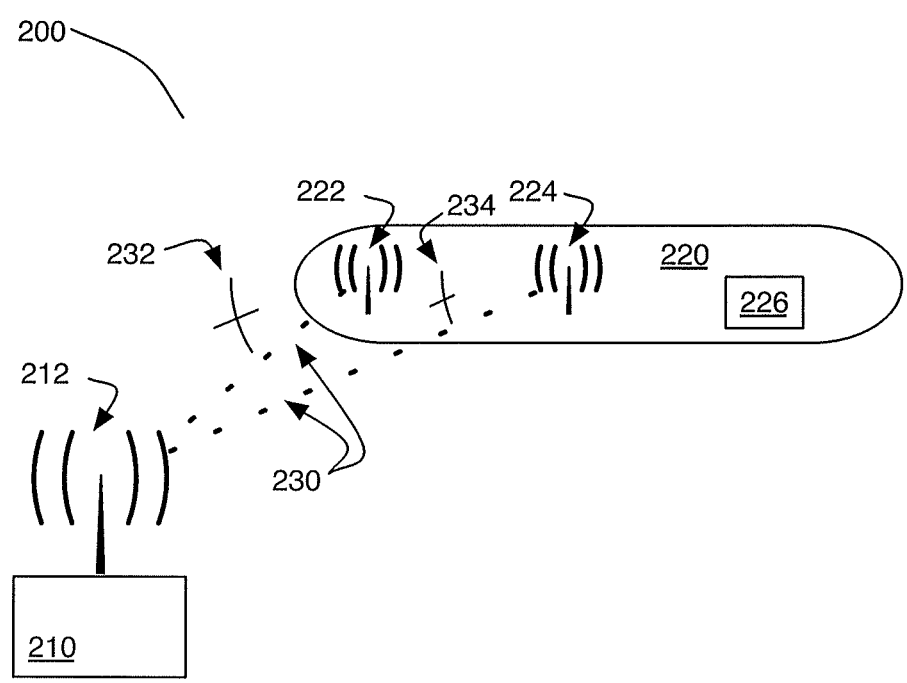

FIG. 2 illustrates a block diagram of an example system 200 for wireless communication, arranged in accordance with at least some embodiments of the present disclosure. As shown, system 200 may include a base station 210 having an antenna 212 and a wireless communication station 220 having a first antenna 222 and a second antenna 224. Furthermore, the wireless communication station 220 may include a communication management module 226. In general, the wireless communication station 220 may be used to wirelessly communicate (e.g., using cellular technology, using packet switching technology, or the like) with the base station 210. In various embodiments, wireless communication may be facilitated even while the wireless communication station 220 is in motion at a high rate of speed.

In various embodiments of the present disclosure, transmitting wireless signals from the base station 210 to the wireless communication station 220 may facilitate wireless communication between the base station 210 and the wireless communication station 220. As such, FIG. 2 shows an example wireless signal 230, which may be incident upon the first antenna 222 and the second antenna 224. Furthermore, angles 232 and 234, corresponding to the angles between the antenna 212 and the antennas 222 and 224 respectively, are also shown.

The wireless communication station 220 then may use the wireless signal 230 as received by either the first antenna 222 or the second antenna 224 depending upon the value of the angles 232 and 234. For example, the value of the angle 232 may be closer to a target angle value than the value of the angle 234. As such, the wireless communication station 220 may use the wireless signal 230, as received at the first antenna 222, for wireless communication with the base station 210. In general, the communication management module 226 may include logic and/or features configured to determine the angles 232 and 234 and also to cause the wireless communication station 220 to use one of the antennas 222 or 224 for communication with the base station 210. In some embodiments, the system 200 may be configured similarly to the system 100 shown in FIG. 1 and described above. For purposes of brevity, this description is not repeated here.

In some examples, as indicated above, the wireless communication station 220 may be a portion of the communication equipment for a vehicle, such as, for example, a high-speed train having multiple cars. As such, in some examples, the first antenna 222 may be mounted on a first car, and the second antenna 224 may be mounted on a second car. In some examples, both the antennas 222 and 224 may be mounted on a single car.

Figure 3:
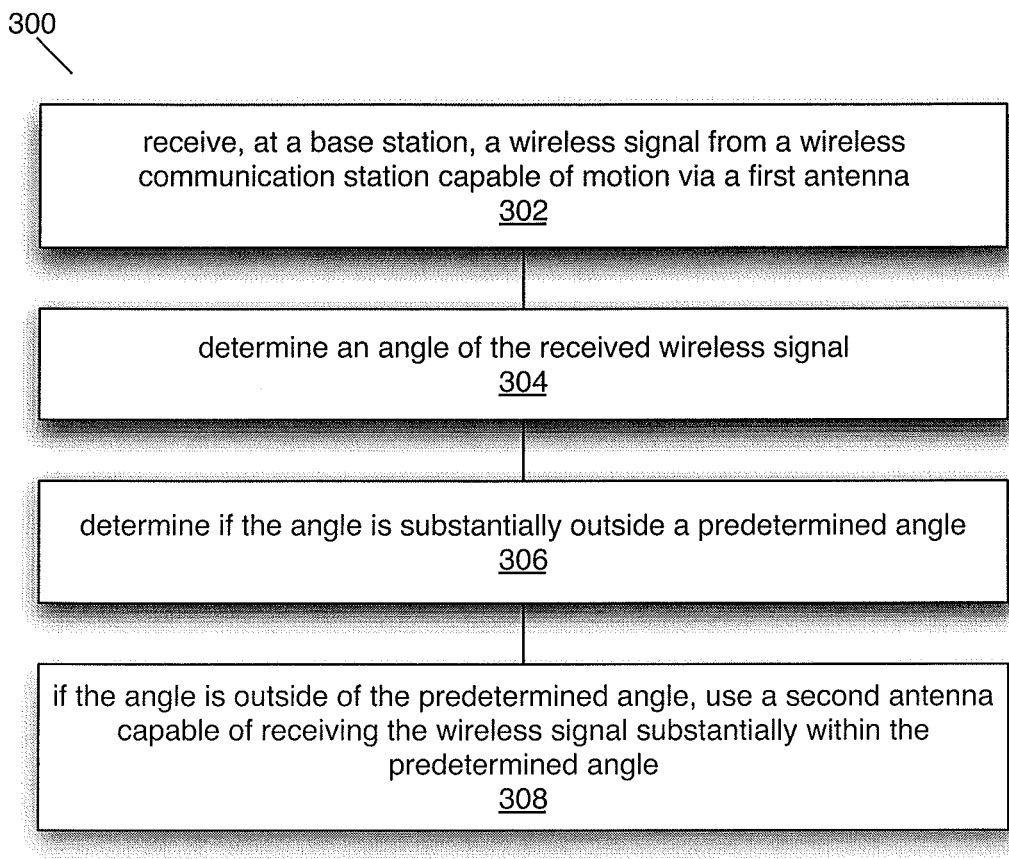
Figure 4:
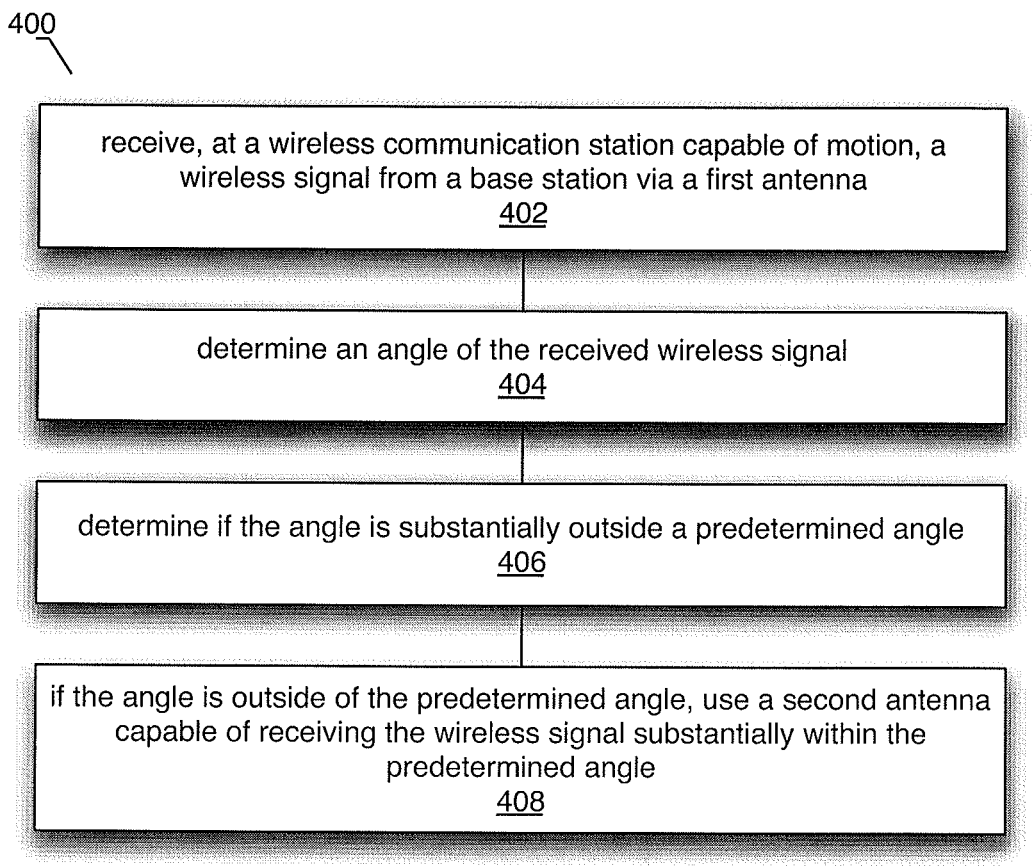

FIGS. 3 and 4 illustrates flow charts of example methods for providing wireless communication at high speeds, arranged in accordance with at least some embodiments of the present disclosure. In some portions of the description, illustrative implementations of the methods are described with reference to elements of the system 100 depicted in FIG. 1. However, the described embodiments are not limited to this depiction. More specifically, some elements depicted in FIG. 1 may be omitted from some implementations of the methods detailed herein. Furthermore, other elements not depicted in FIG. 1 may be used to implement example methods detailed herein. Additionally, other systems, such as, for example, the system 200 depicted in FIG. 2, may be used in some implementations.

Additionally, FIGS. 3 and 4 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks shown in FIGS. 3 and 4 may be practices in various implementations. For example, intervening actions not shown and/or additional actions not shown may be employed and/or some of the actions shown may be eliminated. In some examples, the actions shown in one figure may be operated using techniques discussed with respect to another figure. The above described, and other not described, rearrangements, substitutions, eliminations, changes, modifications, etc., may be made without departing from the scope of claimed subject matter.

FIG. 3 illustrates an example method 300 for wireless communication with a base station. Beginning at block 302, "receive, at a base station, a wireless signal from a wireless communication station capable of motion via a first antenna", the base station 102 may include logic and/or features configured to receive a wireless signal via a first antenna. In general, at block 302, the base station 102 may receive the wireless signal 130 from the wireless communication station 120 via the first antenna 110. For example, the wireless signal 130 may be incident upon the first antenna 110.

Continuing from block 302 to block 304, "determine an angle of the received wireless signal", the base station 102 may include logic and/or features configured to determine the angle of the received wireless signal. In general, at block 304, the base station 102 may determine (e.g., using the communication management module 104, or the like) the angle 132 of the wireless signal 130.

In some examples, the first antenna (e.g., the antenna 110, or the like) may be a directional antenna, having a main direction of radiation. Accordingly, the determined angle (e.g., the angle 132, or the like) may be determined based on the main direction. In some examples, the antenna used to transmit the wireless signal 130 (e.g., the antenna 122, or the like) may have a particular radiation pattern, or shape. Accordingly, the determined angle may be based upon this radiation pattern.

Continuing from block 304 to block 306, "determine if the angle is substantially outside a predetermined angle", the base station 102 may include logic and/or features configured to determine if the angle is substantially outside a predetermined angle. In general, at block 306, the base station 102 may determine if the angle 132 is outside a preferred range (e.g., less than 120 degrees, or the like).

Continuing from block 306 to block 308, "if the angle is outside of the predetermined angle, use a second antenna capable of receiving the wireless signal substantially within the predetermined angle", the base station 102 may include logic and/or features configured to use a second antenna if the determined angle is outside the predetermined angle. In general, at block 308, the base station 102 may use either the first antenna 110 or the second antenna 112 to receive the wireless signal 130 depending upon if the determined angle 132 is greater than the predetermined angle.

In some embodiments of the present disclosure, the method 300 may be continually repeated. For example, during use of the system 100, as the wireless communication station 120 moves locations, the communication management module 104 may be configured to repeatedly perform the operations depicted in FIG. 3. Accordingly, the wireless communication between the wireless communication station 120 and the base station 102 may be maintained by selecting the antenna (e.g., the antenna 110 or the antenna 112) most appropriate for communication (e.g., based upon the angle of the wireless signal 130, based upon the radiation pattern of the antenna used to transmit the wireless signal 130, or the like).

FIG. 4 depicts a method 400 for wireless communication with a wireless communication station capable of motion. Beginning at block 402, "receive, at a wireless communication station capable of motion, a wireless signal from a base station via a first antenna", the wireless communication station 220 may include logic and/or features configured to receive a wireless signal transmitted from a base station via a first antenna. In general, at block 402, the wireless communication station 220 may receive the wireless signal 230 at the first antenna 222.

Continuing from block 402 to block 404, "determine an angle of the received wireless signal", the wireless communication station 220 may include logic and/or features configured to determine an angle of the received wireless signal. In general, at block 404, the wireless communication station 220 may determine (e.g., using the communication management module 226, or the like) the angle 232 of the wireless signal 230.

Continuing from block 404 to block 406, "determine if the angle is substantially outside a predetermined angle", the wireless communication station 220 may include logic and/or features configured to determine if the angle is substantially outside a predetermined angle. In general, at block 406, the wireless communication station 220 may determine if the angle 232 is outside a preferred range (e.g., less than 120 degrees, or the like).

Continuing from block 406 to block 408, "if the angle is outside of the predetermined angle, use a second antenna capable of receiving the wireless signal substantially within the predetermined angle", the wireless communication station 220 may include logic and/or features configured to use a second antenna if the determined angle is outside the predetermined angle. In general, at block 408, the wireless communication station 220 may use either the first antenna 222 or the second antenna 224 to receive the wireless signal 230 depending upon if the determined angle 232 is greater than the predetermined angle.

In general, the methods described with respect to FIGS. 3 and 4 and elsewhere herein may be implemented as a computer program product, executable on any suitable computing system, or the like. For example, a computer program product for wireless communication at high speed may be provided. Example computer program products are described with respect to FIGS. 5 and 6 and elsewhere herein.

FIG. 5 illustrates an example computer program product 500, arranged in accordance with at least some embodiments of the present disclosure. Computer program product 500 may include machine readable non-transitory medium having stored therein instructions that, when executed, operatively enable a communication management module according to the processes and methods discussed herein. Computer program product 500 may include a signal bearing medium 502.

Signal bearing medium 502 may include one or more machine-readable instructions 504, which, when executed by one or more processors, may operatively enable a communication management module to provide the functionality described herein. In various examples, some or all of the machine-readable instructions may be used by the devices discussed herein.

In some examples, the machine readable instructions 504 may include instructions that, when executed, may operatively enable a communication management module to receive a wireless signal from a wireless communication station via a first antenna, the wireless communication station capable of motion. In some examples, the machine readable instructions 504 may include instructions that, when executed, may operatively enable a communication management module to determine an angle of the received wireless signal, the angle based at least in part on a potential rate of motion of the wireless communication station relative to a position of the first antenna and a position of a base station. In some examples, the machine readable instructions 504 may include instructions that, when executed, may operatively enable a communication management module to determine if the angle is substantially outside a predetermined angle. In some examples, the machine readable instructions 504 may include instructions that, when executed, may operatively enable a communication management module to utilize a second antenna, if it is determined that the angle is substantially outside the predetermined angle. The second antenna may have a location capable of receiving the wireless signal substantially within the predetermined angle. The location of the second antenna based at least in part on the potential rate of motion of the wireless communication station and the determined angle.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). In some examples, signal bearing medium 502 may encompass a machine readable non-transitory medium.

FIG. 6 illustrates an example computer program product 600, arranged in accordance with at least some embodiments of the present disclosure. Computer program product 600 may include machine readable non-transitory medium having stored therein instructions that, when executed, cause the machine to enable motion compensation capable communication management according to the processes and methods discussed herein. Computer program product 600 may include a signal bearing medium 602. Signal bearing medium 602 may include one or more machine-readable instructions 604, which, when executed by one or more processors, may operatively enable a motion compensation capable communication management module to provide the functionality described herein. In various examples, some or all of the machine-readable instructions may be used by the devices discussed herein.

In some examples, the machine readable instructions 604 may include instructions that, when executed, may operatively enable a motion compensation capable communication management module to. In some examples, the machine readable instructions 604 may include instructions that, when executed, may operatively enable a motion compensation capable communication management module to receive, at a wireless communication station capable of motion, a wireless signal from a base station via a first antenna communicatively coupled to the wireless communication station. In some examples, the machine readable instructions 604 may include instructions that, when executed, may operatively enable a motion compensation capable communication management module to determine an angle of the received wireless signal, the angle based at least in part on a potential rate of motion of the wireless communication station relative to a position of the base station. In some examples, the machine readable instructions 604 may include instructions that, when executed, may operatively enable a motion compensation capable communication management module to determine if the angle is substantially outside a predetermined angle. In some examples, the machine readable instructions 604 may include instructions that, when executed, may operatively enable a motion compensation capable communication management module to utilize a second antenna communicatively coupled to the wireless communication station, if it is determined that the angle is substantially outside the predetermined angle, the second antenna having a location capable of receiving the wireless signal substantially within the predetermined angle based at least in part on the potential rate of motion of the wireless communication station.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

In general, the methods described with respect to FIGS. 2 and 3 and elsewhere herein may be implemented in any suitable server and/or computing system. Example systems may be described with respect to FIG. 7 and elsewhere herein. In general, the system may be configured to provide wireless communication at high speed.

Figure 7:
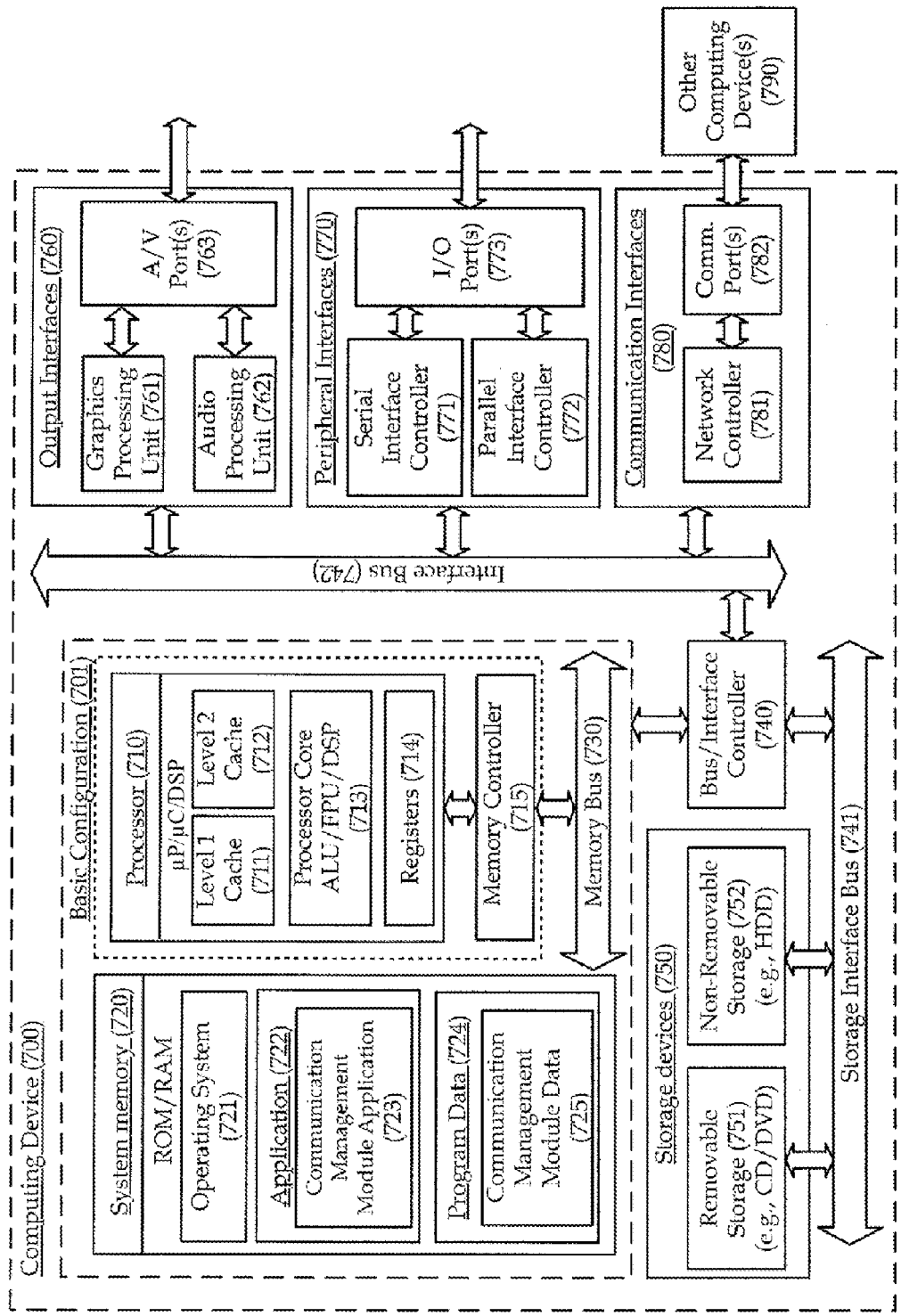

FIG. 7 is a block diagram illustrating an example computing device 700, arranged in accordance with at least some embodiments of the present disclosure. In various examples, computing device 700 may be configured to enable a communication management module as discussed herein. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include communication management module application 723 that can be arranged to perform the functions, actions, and/or operations as described herein including the functional blocks, actions, and/or operations described herein. Program Data 724 may include communication management module data 725 for use with communication management module application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claimed subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for wireless communication comprising:
   receiving, at a base station, a wireless signal from a wireless communication station capable of motion via a first antenna, the first antenna communicatively coupled to the base station;
   determining an angle of the received wireless signal, the angle based at least in part on a potential rate of motion of the wireless communication station relative to a position of the first antenna and a position of the base station;
   determining if the angle is substantially outside a predetermined angle; and
   utilizing a second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

2. The method of claim 1 further comprises:
   receiving a wireless signal from the wireless communication station via the second antenna, the second antenna communicatively coupled to the base station;
   determining a radiation pattern corresponding to an antenna of the wireless communication station used to transmit the wireless signal based at least in part upon the received wireless signal via the first antenna;
   determining a radiation pattern corresponding to the antenna of the wireless communication station used to transmit the wireless signal based at least in part upon the received wireless signal via the second antenna;
   comparing the radiation pattern corresponding to the antenna of the wireless communication station determined based at least in part upon the received wireless signal via the first antenna and the radiation pattern corresponding to the antenna of the wireless communication station determined based at least in part upon the received wireless signal via the second antenna; and
   utilizing at least one of the first antenna or the second antenna to establish a communication link between the wireless communication station and the base station based at least in part on the compared determined radiation patterns.

3. The method of claim 1, wherein receiving the wireless signal from the wireless communication station comprises receiving the wireless signal from a wireless communication station located on a vehicle capable of traveling at a relatively high rate of speed.

4. The method of claim 1, wherein determining the angle of the received wireless signal comprises compensating for a Doppler Shift in the wireless signal.

5. The method of claim 4, wherein compensating for the Doppler Shift in wireless signal comprises modeling the wireless signal based at least in part on a Jakes' Model.

6. The method of claim 1, wherein determining if the angle is substantially outside the predetermined angle comprises determining if the angle is substantially outside 120 degrees.

7. A method for wireless communication comprising:
   receiving, at a wireless communication station capable of motion, a wireless signal from a base station via a first antenna communicatively coupled to the wireless communication station;
   determining an angle of the received wireless signal, the angle based at least in part on a potential rate of motion of the wireless communication station relative to a position of the base station;
   determining if the angle is substantially outside a predetermined angle; and
   utilizing a second antenna communicatively coupled to the wireless communication station, if it is determined that the angle is substantially outside the predetermined angle, the second antenna having a location capable of receiving the wireless signal substantially within the predetermined angle based at least in part on the potential rate of motion of the wireless communication station.

8. The method of claim 7 further comprises:
   receiving a wireless signal from the base station via the second antenna;

determining a radiation pattern corresponding to an antenna of the base station used to transmit the wireless signal based at least in part upon the received wireless signal via the first antenna;

determining a radiation pattern corresponding to the antenna of the base station used to transmit the wireless signal based at least in part upon the received wireless signal via the second antenna;

comparing the radiation pattern corresponding to the antenna of the base station determined based at least in part upon the received wireless signal via the first antenna and the radiation pattern corresponding to the antenna of the base station determined based at least in part upon the received wireless signal via the second antenna; and utilizing at least one of the first antenna or the second antenna to establish a communication link between the wireless communication station and the base station based at least in part on the compared determined radiation patterns.

9. The method of claim 1, wherein the wireless communication station comprises a wireless communication station located on a vehicle capable of traveling at a relatively high rate of speed.

10. The method of claim 1, wherein determining the angle of the received wireless signal comprises compensating for a Doppler Shift in the wireless signal.

11. The method of claim 1, wherein determining if the angle is substantially outside the predetermined angle comprises determining if the angle is substantially outside 120 degrees.

12. A wireless communication system comprising:
a base station;
a first antenna, the first antenna communicatively coupled to the base station;
a second antenna, the second antenna communicatively coupled to the base station;
a communication management module, the communication module communicatively coupled to the base station, the first antenna, and the second antenna; and
a machine readable non-transitory medium having stored therein instructions that, when executed by one or more processors, operatively enable the communication management module to:
receive a wireless signal from the wireless communication station via the first antenna;
determine an angle of the received wireless signal, the angle based at least in part on a potential rate of motion of the wireless communication station relative to a position of the first antenna and a position of the base station;
determine if the angle is substantially outside a predetermined angle; and
utilize the second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

13. The wireless communication system of claim 12, wherein the machine readable non-transitory medium has stored therein further instructions that, when executed by one or more processors, further operatively enable the communication management module to:
receive a wireless signal from the wireless communication station via the second antenna, the second antenna communicatively coupled to the base station;

determine a radiation pattern corresponding to an antenna of the wireless communication station used to transmit the wireless signal based at least in part upon the received wireless signal via the first antenna;

determine a radiation pattern corresponding to the antenna of the wireless communication station used to transmit the wireless signal based at least in part upon the received wireless signal via the second antenna;

compare the radiation pattern corresponding to the antenna of the wireless communication station determined based at least in part upon the received wireless signal via the first antenna and the radiation pattern corresponding to the antenna of the wireless communication station determined based at least in part upon the received wireless signal via the second antenna; and utilize at least one of the first antenna or the second antenna to establish a communication link between the wireless communication station and the base station based at least in part on the compared determined radiation patterns.

14. The wireless communication system of claim 12, wherein the machine readable non-transitory medium has stored therein further instructions that, when executed by one or more processors, further operatively enable the communication management module to receive the wireless signal from a wireless communication station located on a vehicle capable of traveling at a relatively high rate of speed.

15. The wireless communication system of claim 12, wherein the machine readable non-transitory medium has stored therein further instructions that, when executed by one or more processors, further operatively enable the communication management module to compensate for a Doppler Shift in the wireless signal.

16. The wireless communication system of claim 15, wherein the machine readable non-transitory medium has stored therein further instructions that, when executed by one or more processors, further operatively enable the communication management module to model the wireless signal based at least in part on a Jakes' Model.

17. The wireless communication system of claim 12, wherein the machine readable non-transitory medium has stored therein further instructions that, when executed by one or more processors, further operatively enable the communication management module to determine if the angle is substantially outside 120 degrees.

18. A wireless communication system comprising:
a wireless communication station, the wireless communication station capable of motion;
a first antenna, the first antenna communicatively coupled to the wireless communication station;
a second antenna, the second antenna communicatively coupled to the wireless communication station;
a motion compensation capable communication management module, the motion compensation capable communication management module communicatively coupled to the wireless communication station, the first antenna, and the second antenna; and
a machine readable non-transitory medium having stored therein instructions that, when executed by one or more processors, operatively enable the motion compensation capable communication management module to:
receive a wireless signal from a base station via the first antenna;
determine an angle of the received wireless signal, the angle based at least in part on a potential rate of motion of the wireless communication station relative to a position of the first antenna and a position of the base station;

determine if the angle is substantially outside a predetermined angle; and
utilize the second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

19. The wireless communication system of claim 18, wherein the machine readable non-transitory medium has stored therein further instructions that, when executed by one or more processors, further operatively enable the communication management module to:
receive a wireless signal from the base station via the second antenna;
determine a radiation pattern corresponding to an antenna of the base station used to transmit the wireless signal based at least in part upon the received wireless signal via the first antenna;
determine a radiation pattern corresponding to the antenna of the base station used to transmit the wireless signal based at least in part upon the received wireless signal via the second antenna;
compare the radiation pattern corresponding to the antenna of the base station determined based at least in part upon the received wireless signal via the first antenna and the radiation pattern corresponding to the antenna of the base station determined based at least in part upon the received wireless signal via the second antenna; and
utilize at least one of the first antenna or the second antenna to establish a communication link between the wireless communication station and the base station based at least in part on the compared determined radiation patterns.

20. The wireless communication system of claim 18, wherein the wireless communication station comprises a wireless communication station located on a vehicle capable of traveling at a relatively high rate of speed.

21. The wireless communication system of claim 18, wherein the machine readable non-transitory medium has stored therein further instructions that, when executed by one or more processors, further operatively enable the communication management module to compensate for a Doppler Shift in the wireless signal.

22. The wireless communication system of claim 18, wherein the machine readable non-transitory medium has stored therein further instructions that, when executed by one or more processors, further operatively enable the communication management module to determine if the angle is substantially outside 120 degrees.

23. A machine readable non-transitory medium having stored therein instructions that, when executed by one or more processors, operatively enable a communication management module to:
receive a wireless signal from a wireless communication station via a first antenna, the wireless communication station capable of motion;
determine an angle of the received wireless signal, the angle based at least in part on a potential rate of motion of the wireless communication station relative to a position of the first antenna and a position of a base station;
determine if the angle is substantially outside a predetermined angle; and
utilize a second antenna, if it is determined that the angle is substantially outside the predetermined angle, the second antenna having a location capable of receiving the wireless signal substantially within the predetermined angle, the location of the second antenna based at least in part on the potential rate of motion of the wireless communication station and the determined angle.

24. The machine readable non-transitory medium of claim 23, wherein the stored instruction that, when executed by one or more processors, further operatively enable the communication management module to:
receive a wireless signal from the wireless communication station via the second antenna, the second antenna communicatively coupled to the base station;
determine a radiation pattern corresponding to an antenna of the wireless communication station used to transmit the wireless signal based at least in part upon the received wireless signal via the first antenna;
determine a radiation pattern corresponding to the antenna of the wireless communication station used to transmit the wireless signal based at least in part upon the received wireless signal via the second antenna;
compare the radiation pattern corresponding to the antenna of the wireless communication station determined based at least in part upon the received wireless signal via the first antenna and the radiation pattern corresponding to the antenna of the wireless communication station determined based at least in part upon the received wireless signal via the second antenna; and
utilize at least one of the first antenna or the second antenna to establish a communication link between the wireless communication station and the base station based at least in part on the compared determined radiation patterns.

25. The machine readable non-transitory medium of claim 23, wherein the stored instruction that, when executed by one or more processors, further operatively enable the communication management module to receive the wireless signal from a wireless communication station located on a vehicle capable of traveling at a relatively high rate of speed.

26. The machine readable non-transitory medium of claim 23, wherein the stored instruction that, when executed by one or more processors, further operatively enable the communication management module to compensate for a Doppler Shift in the wireless signal.

27. The machine readable non-transitory medium of claim 26, wherein the stored instruction that, when executed by one or more processors, further operatively enable the communication management module to model the wireless signal based at least in part on a Jakes' Model.

28. The machine readable non-transitory medium of claim 23, wherein the stored instruction that, when executed by one or more processors, further operatively enable the communication management module to determine if the angle is substantially outside 120 degrees.

29. A machine readable non-transitory medium having stored therein instructions that, when executed by one or more processors, operatively enable a motion compensation capable communication management module to:
receive, at a wireless communication station capable of motion, a wireless signal from a base station via a first antenna communicatively coupled to the wireless communication station;
determine an angle of the received wireless signal, the angle based at least in part on a potential rate of motion of the wireless communication station relative to a position of the base station;
determine if the angle is substantially outside a predetermined angle; and utilize a second antenna communicatively coupled to the wireless communication station, if it is determined that the angle is substantially outside the predetermined angle, the second antenna having a location capable of receiving the wireless signal substantially within the predetermined angle based at least in part on the potential rate of motion of the wireless communication station.

30. The machine readable non-transitory medium of claim 29, wherein the stored instruction that, when executed by one or more processors, further operatively enable the communication management module to:
receive a wireless signal from the base station via the second antenna;
determine a radiation pattern corresponding to an antenna of the base station based at least in part upon the received wireless signal via the first antenna;
determine a radiation pattern corresponding to the antenna of the base station based at least in part upon the received wireless signal via the second antenna;
compare the radiation pattern corresponding to the antenna of the base station determined based at least in part upon the received wireless signal via the first antenna and the radiation pattern corresponding to the antenna of the base station determined based at least in part upon the received wireless signal via the second antenna; and
utilize at least one of the first antenna or the second antenna to establish a communication link between the wireless communication station and the base station based at least in part on the compared determined radiation patterns.

31. The machine readable non-transitory medium of claim 29, wherein the stored instruction that, when executed by one or more processors, further operatively enable the communication management module to receive the wireless signal at a wireless communication station located on a vehicle capable of traveling at a relatively high rate of speed.

32. The machine readable non-transitory medium of claim 29, wherein the stored instruction that, when executed by one or more processors, further operatively enable the communication management module to compensate for a Doppler Shift in the wireless signal.

33. The machine readable non-transitory medium of claim 29, wherein the stored instruction that, when executed by one or more processors, further operatively enable the communication management module to determine if the angle is substantially outside 120 degrees.

* * * * *